Inventor
Theodore M. Vullings
Attorneys

Dec. 6, 1938.　　　　T. M. VULLINGS　　　2,139,141
HEATER FOR HOUSE TRAILERS
Filed July 1, 1937　　　2 Sheets-Sheet 2
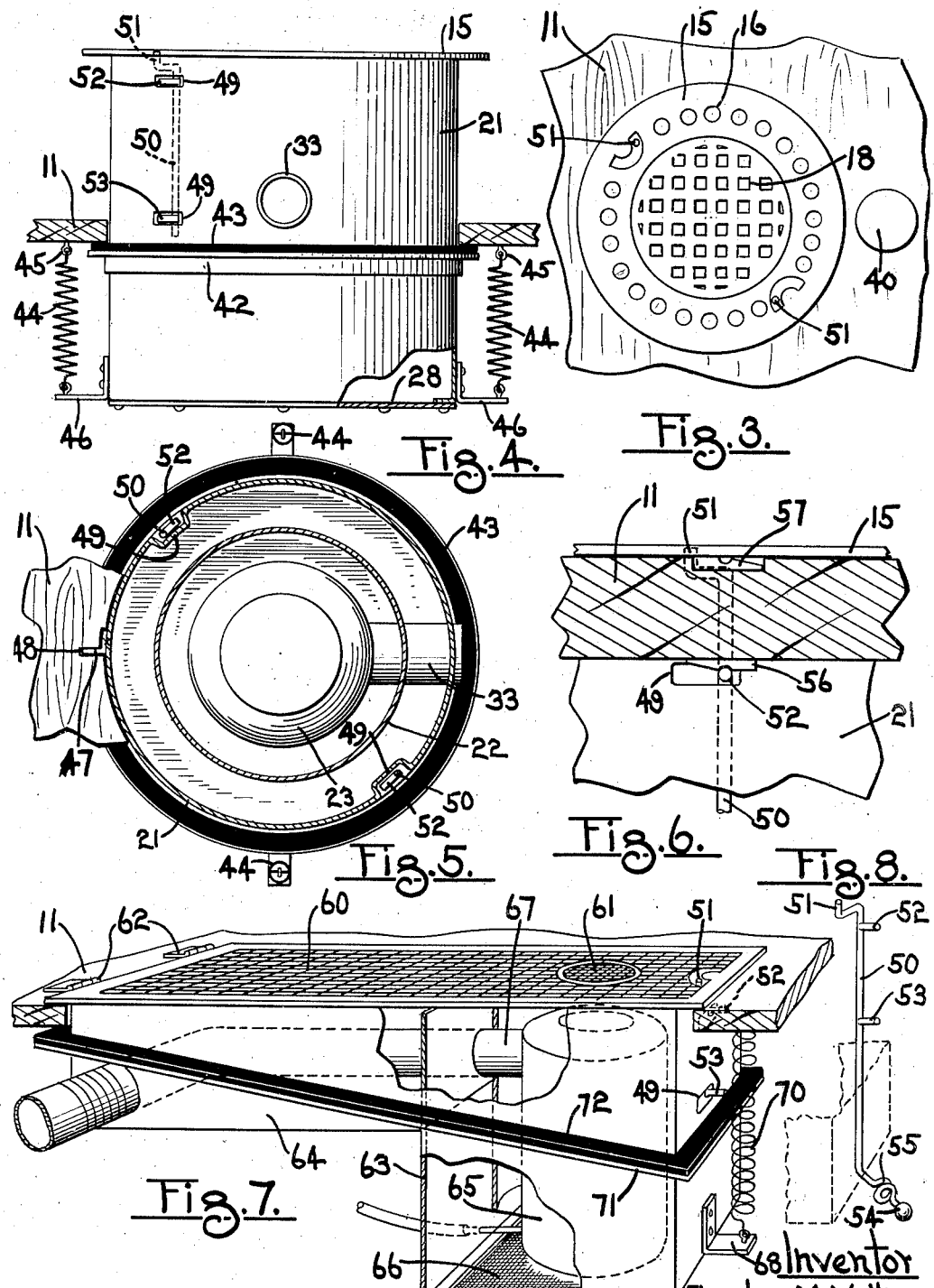

Patented Dec. 6, 1938

REISSUED
MAR 4 1941

2,139,141

UNITED STATES PATENT OFFICE 2,139,141

HEATER FOR HOUSE TRAILERS

Theodore M. Vullings, Grand Rapids, Mich.

Application July 1, 1937, Serial No. 151,345

5 Claims. (Cl. 126—56)

This invention relates generally to movable units for trailers and more particularly to a heating element mounted in the floor of a trailer.

Briefly described, my invention relates to a heating unit which has its heat delivering surface facing the interior of a trailer and its working parts therebehind, the unit being slidably mounted.

One purpose of my invention is to provide a maximum of space inside of the trailer when it is stationary, this being obtained by the substantially flush heater mounting.

Another advantage resides in my novel mounting construction whereby the heating unit may be readily moved to and from its operating position.

Another feature resides in my counterbalanced mounting for the unit together with its locking means.

Yet another advantage is my construction whereby entry of outside air may be had.

Still another feature is my automatic safety release.

In the drawings:

Fig. 3 is a plan view of my invention.

Fig. 4 is a sectional elevation through the trailer floor, the heating device being in its raised position.

Fig. 5 is a sectional view through the heating unit.

Fig. 6 is an enlarged sectional view illustrating the locking means.

Fig. 7 is a perspective view of a modification of my invention.

Fig. 8 is a perspective view of the locking means.

Like numerals refer to like parts through the drawings.

Figure 1:
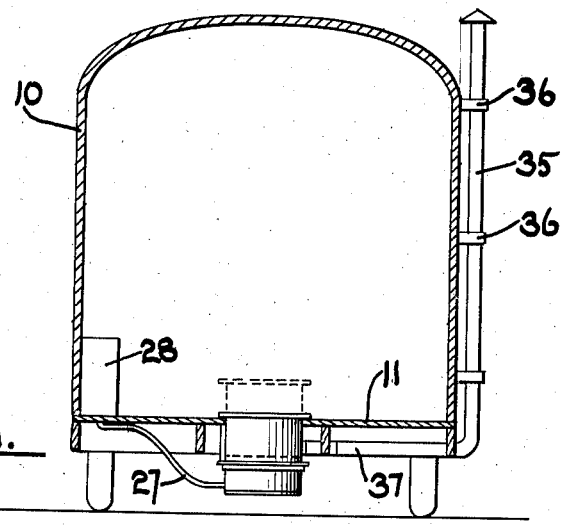
Fig. 1 is a sectional view through a trailer showing my invention installed therein.

Numeral 10 indicates a trailer having a floor 11. The floor 11 has an opening therethrough to receive my invention.

As shown in Fig. 3 of the drawings, a grille or register 15 has a plurality of openings 16 therein and a central opening. A second grille 18 fits the central opening. The outer register ring 15 rests upon the floor 11 and has depending flanges 19 and 20, the former carrying the outer shell 21 of the furnace and the inner supporting the shorter inner shell 22. The openings 16 (see Fig. 2) serve to admit the cooler air which is drawn downwardly between the shells and underneath shell 22.

A heating unit 23 is located inside of and spaced from the shell 22 and heats the air adjacent thereto thus causing it to rise through the register 18 to give a natural circulation in the trailer.

The lower end of the outer shell 21 is turned inwardly as indicated at 24 and cross bars 25 extend thereabove to serve as a mounting for the heating unit 23. Fuel is supplied to the unit 23 from reservoir 28 through flexible means 27. See Fig. 1.

A screen 30, detachably held in place by ring 31 and bolts 32, admits fresh air as desired. As shown in Fig. 4, a plate 28 may replace the screen.

A pipe 33 leads from the unit 23 through the casing 22 and slightly beyond casing 21.

A stack 35, see Fig. 1, is detachably held in place by flexible forked means 36 and its lower lateral portion 37 slidably receives a joint section 38.

This section 38 is accessible for movement through the small opening 39, normally closed by door 40.

A ring 42, carrying a soft rubber ring 43, is attached to the casing 21 and contacts against the underside of the floor 11, see Fig. 4, when the device rises to its upper position. Thus, a tight seal is had to prevent the entry of dust during movement of the trailer.

Springs 44, fastened at 45 to the underside of the floor and at 46 to the outer casing 21, urge the device to its upper position.

A vertical angle member 47, see Fig. 5, rides in a notch 48 in the floor and prevents rotation of the device. Locking means, see Fig. 8 of the drawings, comprises a vertical rod 50 having a crank 51 to rotate the same and extensions 52 and 53 therebelow. Below these extensions it is extended forwardly of the device and terminates in a ball 54, a yieldable portion 55 being located adjacent the ball 54.

Figure 2:
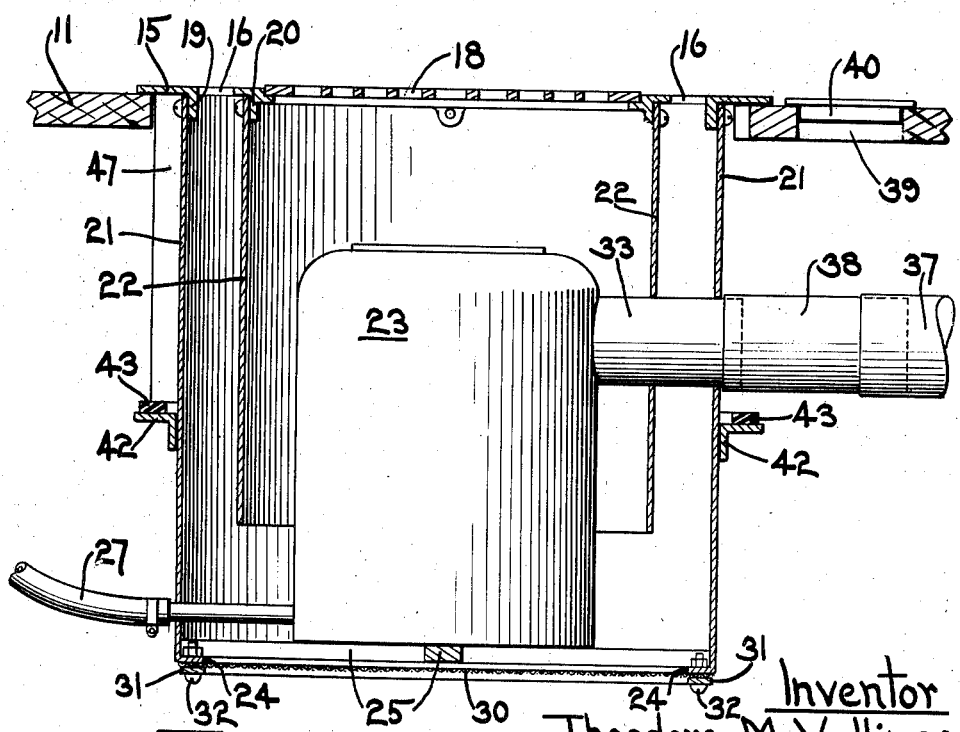
Fig. 2 is an enlarged fragmentary portion of Fig. 1.

Two of these locking means are necessary, see Fig. 3 of the drawings. The outer casing is indented at 49 to form bearings for the member 50 and housings for the arms thereon. See Figs. 4 and 5. The operating cranks 51 extend through crescent shaped slots in the register 15. When the unit is in its lower position, as shown in Fig. 2, the crank 51 is turned so as to bring the arm 52 underneath the floor 11 to seat within a block 56. See Fig. 6.

Release of the locking means, by manually rotating the crank 51, causes disengagement of the arm 52 and the block 56 thus permitting upward movement of the device to the position shown in Fig. 4. Whereupon, the crank 51 is again operated to bring the other arm 53 to seat in a second block 57, see Fig. 6, to thus prevent movement of the device during transportation of the trailer.

After the destination is reached, the locking means may be released and the device easily pushed downwardly against the action of the springs 44 by merely stepping upon the register and then it is locked in place.

Referring now to Fig. 7, this showing the preferred form of my invention, numeral 60 illustrates a grille, having a detachable disc 61 therein, pivotally hinged at one end as indicated at 62.

A casing 63, having a shallower portion 64, is attached to the register 60 and carries the heating unit 65. The bottom of the casing 63 is perforated as indicated at 66 to admit fresh air as desired. Suitable covering means is provided. A stack 67 leads from the heating unit 65 through the portion 64 of the casing and outwardly as shown.

A bracket member 68 extends from the casing 63 and a spring 70 connects thereto and to a point underneath the floor 11 to urge the device to an upper position. A strip 71, carrying the rubber sealing strip 72, extends as shown, and comes against the underside of the floor when the device is urged upwardly by means of the spring.

One of the automatic locking means, as shown in Fig. 8 of the drawing, is provided to cooperate in an identical manner as previously described, the arm 53 preventing downward movement of the device and the extension 52 preventing upward movement thereof.

In this form of invention it will be appreciated that the stack connection 67 can be permanently connected with the riser therefrom inasmuch as the relative movement of the different portions of the stack can be taken care of by means of a pair of elbows or flexible tubing.

The operation of my device is easily understood. As previously described the complete unit is movable from a position shown in Fig. 4, this being the position when the trailer is being moved, to a position as shown in Fig. 2.

Should the trailer be moved while the device is in its lower position, the locking lever 50 may become automatically unlocked due to any contact between the ball 45 and the obstruction. Contact therebetween causes rotation of the rod 50 with a consequent release of the arm 52 from its position underneath the floor, see Fig. 6, whereupon the spring or springs immediately urged the device upwardly. The spring 55 in the rod 50 lessens the shock of accidental contact. Thus breakage of the device is prevented.

Having thus described this invention what I claim as new and desire to secure by Letters Patent of the United States is:

1. In combination with a house trailer having an opening in the floor thereof, a heater, means for movably mounting the heater in said opening whereby it is movable therefrom to a position inwardly from its normal position so that it is more or less housed within the said trailer, spring means for moving the said heater to said position within the said trailer and means for holding it against movement by the said last mentioned means.

2. In a floor having a horizontal opening therethrough, a heater movably mounted to move through the opening, spring means tending to urge the heater to an upper position, means for locking the heater in its lower position, said locking means preventing operation of the said spring means.

3. In combination with a house trailer or the like having an opening in a wall thereof, a heater mounted for movement through the said wall to an inner position and to an outer position, spring means for urging this heater in one of its positions, means for locking the heater in its other position and trip means for releasing the said locking means.

4. In a trailer having a movable heating element spring pressed to one position and capable of being latched against movement to the same position, the combination of automatic operable means cooperatively associated with said automatic means, said automatic means including an element extending downwardly to close proximity with the ground for the purpose described.

5. A combination of elements as in claim 3 in which the automatic means has a vertical portion, and a yieldable extension at or near its lower extremity.

THEODORE M. VULLINGS.